(12) United States Patent
Sato (10) Patent No.: US 9,229,177 B1
(45) Date of Patent: Jan. 5, 2016

(54) BACKLASH PREVENTION MECHANISM OF ADAPTER FOR OPTICAL CONNECTOR

(71) Applicant: SANWA DENKI KOGYO CO., LTD., Tokyo (JP)

(72) Inventor: Takashi Sato, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 16 days.

(21) Appl. No.: 14/332,619

(22) Filed: Jul. 16, 2014

(51) Int. Cl.
G02B 6/00 (2006.01)
G02B 6/38 (2006.01)
G02B 6/42 (2006.01)
G02B 6/36 (2006.01)

(52) U.S. Cl.
CPC ............ *G02B 6/3898* (2013.01); *G02B 6/4261* (2013.01); *G02B 6/36* (2013.01); *G02B 6/3807* (2013.01); *G02B 6/3821* (2013.01); *G02B 6/3825* (2013.01); *G02B 6/3877* (2013.01)

(58) Field of Classification Search
CPC ...... G02B 6/36; G02B 6/3807; G02B 6/3821; G02B 6/3825; G02B 6/4261
USPC ...................................... 385/53–56, 134–139
See application file for complete search history.

(56) References Cited

U.S. PATENT DOCUMENTS

| 4,820,185 | A * | 4/1989 | Moulin | H01R 13/621 |
| | | | | 385/59 |
| 5,669,871 | A * | 9/1997 | Sakiyama | A61B 5/1076 |
| | | | | 348/135 |
| 6,513,989 | B1 * | 2/2003 | Bleck | G02B 6/3879 |
| | | | | 385/60 |
| 6,776,623 | B1 * | 8/2004 | Yunker | H01R 12/7076 |
| | | | | 439/66 |
| 7,037,136 | B1 * | 5/2006 | Korsunsky | H01R 13/5213 |
| | | | | 174/16.1 |
| 7,083,336 | B2 * | 8/2006 | Kim | G02B 6/4292 |
| | | | | 385/88 |
| 7,128,709 | B2 * | 10/2006 | Saruya | A61B 1/00105 |
| | | | | 600/130 |
| 7,255,490 | B2 * | 8/2007 | Zhang | G02B 6/4246 |
| | | | | 385/139 |
| 7,364,373 | B2 * | 4/2008 | Ishikawa | G02B 6/4201 |
| | | | | 385/89 |
| 7,699,536 | B2 * | 4/2010 | Yoshikawa | G02B 6/4292 |
| | | | | 385/139 |
| 7,720,345 | B2 * | 5/2010 | Katagiyama | G02B 6/3898 |
| | | | | 385/134 |
| 8,376,634 | B2 * | 2/2013 | Oki | G02B 6/4292 |
| | | | | 385/89 |
| 8,414,196 | B2 * | 4/2013 | Lu | G02B 6/3816 |
| | | | | 385/60 |
| 8,678,848 | B2 * | 3/2014 | Chan | H01R 43/20 |
| | | | | 439/159 |
| 8,770,855 | B2 * | 7/2014 | Miller | G02B 6/4293 |
| | | | | 385/53 |
| 8,920,044 | B2 * | 12/2014 | Shimazu | G02B 6/3807 |
| | | | | 385/55 |
| 2006/0178057 | A1 * | 8/2006 | Lloyd | H01R 13/508 |
| | | | | 439/701 |

(Continued)

FOREIGN PATENT DOCUMENTS

| JP | 2009230033 A | * 10/2009 | ............... G02B 6/36 |
| JP | 2011133611 A | 7/2011 | |

*Primary Examiner* — Ryan Lepisto
*Assistant Examiner* — Guy Anderson
(74) *Attorney, Agent, or Firm* — Bacon & Thomas, PLLC (57) ABSTRACT

A backlash prevention tool is formed by provision of a C-shaped frame-like support portion installed to an engagement surface portion hollowed out and formed from a side wall surface of an adapter main body toward upper and lower wall surfaces, a come-off preventing locking piece protruded in a diagonally outer direction from a center side edge of the support portion so as to face to locking protrusions formed at the center of both side surface portions of the adapter main body, and backlash preventing locking pieces protruded in diagonally outer directions of respective side edges in both sides and upper and lower sides of the come-off preventing locking piece at the center of the support portion so as to come into pressure contact with respective sides of an inner side of an opening edge of an adapter attaching hole of a panel and are formed into a leaf spring.

3 Claims, 7 Drawing Sheets

(56) References Cited

U.S. PATENT DOCUMENTS

| | | | | | |
|---|---|---|---|---|---|
| 2007/0123090 | A1* | 5/2007 | Kim | ..................... | G02B 6/4201 439/372 |
| 2008/0279510 | A1* | 11/2008 | Chan | ..................... | G02B 6/4277 385/89 |
| 2009/0080838 | A1* | 3/2009 | Chen | ..................... | G02B 6/3846 385/72 |
| 2011/0103797 | A1* | 5/2011 | Oki | ..................... | G02B 6/4292 398/79 |
| 2011/0225792 | A1* | 9/2011 | Oki | ..................... | G02B 6/4292 29/428 |
| 2013/0071072 | A1* | 3/2013 | Xie | ..................... | G02B 6/4277 385/92 |
| 2013/0156418 | A1* | 6/2013 | Stapleton | ............... | H04B 10/40 398/25 |
| 2014/0029897 | A1* | 1/2014 | Shimazu | .............. | G02B 6/3807 385/76 |
| 2014/0199028 | A2* | 7/2014 | Shimazu | .............. | G02B 6/3807 385/76 |

* cited by examiner

BACKLASH PREVENTION MECHANISM OF ADAPTER FOR OPTICAL CONNECTOR

BACKGROUND OF THE INVENTION

1. Field of the Invention

The present invention relates to a backlash prevention mechanism of an adapter for an optical connector in high-density mounting of an optical connector plug.

2. Description of the Conventional Art

Figure 7A:
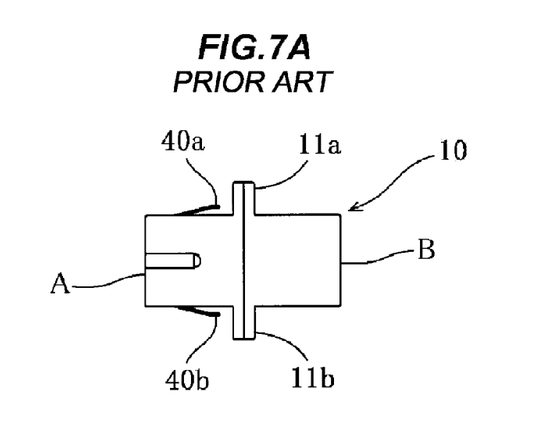
FIG. 7A is a plan view of the adapter main body.
Figure 7B:
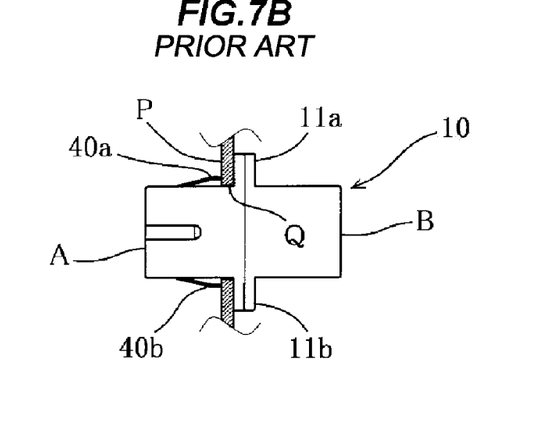
FIG. 7B is a plan view showing a panel portion of a state in which the adapter main body is attached to an adapter attaching hole of the panel, by a cross section.

Conventionally, a so-called snap-in system has been employed as a backlash prevention mechanism of an adapter for an optical connector which is used in high-density mounting of an optical connector plug. As shown in FIGS. 7A and 7B, the so-called snap-in system is provided with locking protrusions 11a and 11b which are formed in a side surface of an adapter main body 10 for an optical connector, and spring locking pieces 40a and 40b for fixing a panel, the spring locking pieces 40a and 40b being formed so as to face to the locking protrusions 11a and 11b, is inserted to an adapter attaching hole Q of a panel P while pressing the spring locking pieces 40a and 40b, and is fixed by pinching an opening edge portion of the adapter attaching hole Q between the locking protrusions 11a and 11b and the spring locking pieces 40a and 40b.

In the meantime, in the case of the snap-in system mentioned above, a gap is generated between an opening edge inner side of the adapter attaching hole Q pinched by the locking protrusions 11a and 11b and the spring locking pieces 40a and 40b, and the adapter main body 10, when the adapter main body 10 for the optical connector is inserted to the adapter attaching hole Q of the panel P. As a result, there has been a problem that backlash is generated in vertical and lateral directions in the adapter main body 10.

Further, in the case that the panel P is vibrated, there has been a problem that chattering sound is generated by the backlash of the adapter main body 10 as mentioned above.

Accordingly, the applicant of the present invention has proposed a backlash prevention mechanism of an adapter for an optical connector (patent document 1), the backlash prevention mechanism being provided with a backlash prevention tool 100 which is attached to an adapter main body for the optical connector and is formed into a C-shaped frame shape.

Figure 8A:
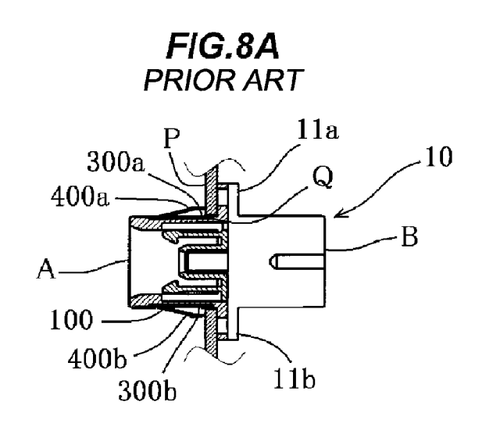
FIG. 8A is a plan view showing a panel portion of a state in which the adapter main body is attached to an adapter attaching hole of the panel, by a cross section.
Figure 8B:
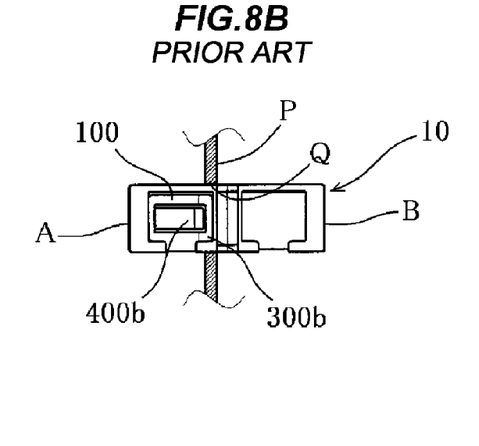
FIG. 8B is a side elevational view showing the panel portion of the state in which the adapter main body is attached to the adapter attaching hole of the panel, by a cross section.

Namely, the backlash prevention tool 100 is provided with first locking piece portions 300a and 300b which are formed into a C-shaped frame installed to the adapter main body 10 for the optical connector, and are folded in a diagonally outward direction so that both left and right end side surface portions of the C-shaped from come into pressure contact with the opening edge inner sides of the adapter attaching hole Q of the panel P in a lateral direction, and second locking piece portions 400a and 400b which are cut and raised from the center of both the left and right end side surface portions of the C-shaped frame so as to face to the locking protrusions 11a and 11b which are formed in both the left and right side surface portions of the adapter main body 10, as shown in FIGS. 8A and 8B.

As mentioned above, the adapter main body 10 is inserted to the adapter attaching hole Q while pressing the second locking piece portions 400a and 400b of the backlash prevention tool 100, and pinches and fixes both the left and right side portions of the opening edge portion of the adapter attaching hole Q between the locking protrusions 11a and 11b and the second locking piece portions 400a and 400b, and the first locking piece portions 300a and 300b of the backlash prevention tool 100 are formed so as to be pressure crushed and come into pressure contact with the opening edge inner side of the adapter attaching hole Q.

PRIOR ART DOCUMENT

Patent Document

Patent Document 1: Japanese Unexamined Patent Publication No. 2011-133611

SUMMARY OF THE INVENTION

Problem to be Solved by the Invention

However, even in the case of the patent document 1 mentioned above, a gap is generated due to a processing error between upper and lower inner wall surfaces of the opening edge inner side of the adapter attaching hole Q and upper and lower side wall surfaces of the adapter main body 10, when the adapter main body 10 for the optical connector is inserted to the adapter attaching hole Q of the panel P, as shown in FIG. 8B, so that it has been impossible to sufficiently effectively prevent the backlash from being generated in the vertical direction due to the gap.

Accordingly, the present invention is made by taking into consideration the conventionally existing various circumstances as mentioned above, and an object of the present invention is to provide a backlash prevention mechanism of an adapter for an optical connector, the backlash prevention mechanism which can simultaneously and effectively prevent generation of backlash of an adapter main body from being generated in vertical and lateral directions due to each of gaps which are generated upper and lower inner wall surfaces and right and left inner wall surfaces of an opening edge inner side of an adapter attaching hole, and upper and lower side wall surfaces and right and left side wall surfaces of the adapter main body, when the adapter main body for the optical connector is inserted to the adapter attaching hole of a panel.

Means for Solving the Problem

In order to achieve the object mentioned above, according to the present invention, there is provided a backlash prevention mechanism comprising:

a pair of right and left backlash prevention tools which are detachably mounted to an adapter main body for an optical connector, wherein each of the backlash prevention tools comprises:

a C-shaped frame-like support portion which is installed to an engagement surface portion formed by hollowing out from side wall surfaces to upper and lower wall surfaces of the adapter main body;

a come-off preventing locking piece which is protruded in a diagonally outer direction from a center side edge of the C-shaped frame-like support portion so as to face to a locking protrusion formed in the center of both side surface portions of the adapter main body; and a plurality of leaf spring-like backlash preventing locking pieces which are protruded in a diagonally outer direction from both sides and upper and lower side edges of the come-off preventing locking piece at the center of the C-shaped frame-like support portion so as to come into pressure contact with inner sides of an opening edge of an adapter attaching hole of a panel vertically and laterally, and wherein the adapter main body is inserted to the adapter attaching hole of the panel while pressing the come-off preventing locking piece of the backlash prevention tool which is installed to the engagement surface portion, and pinches and fixes the opening edge portion of the adapter attaching hole between the locking protrusion and the come-off preventing locking piece, and each of backlash preventing locking pieces of the backlash prevention tool is formed so as to be pressure crushed and come into pressure contact with each of the inner sides of the opening edge of the adapter attaching hole vertically and laterally from an inner side to an outer side.

The support portion is formed into a C-shaped from by a side support surface portion at the center, and vertical support surface portions which are extended in a perpendicular direction from both end sides of the side support surface portion, and a locking hole is formed in a center surface of the vertical support surface portion, the locking hole being engaged with a locking projection protruded from each of both upper and lower wall surfaces of the adapter main body.

The backlash preventing locking piece is formed by a pair of lateral backlash preventing locking piece which are respectively protruded in a diagonally outer direction from both side edges of the come-off preventing locking piece at the center of the side support surface portion and are formed into a leaf spring, and a pair of vertical backwash preventing locking pieces which are protruded in a diagonally outer direction from the respective side edges of the vertical support surface portion and are formed into a leaf spring, in the support portion which is formed into the C-shaped frame by the side support surface portion at the center, and the vertical support surface portions which are extended in the perpendicular direction from both end sides of the side support surface portion.

Effect of the Invention

According to the present invention, it is possible to simultaneously and effectively prevent generation of backlash of the adapter main body in vertical and lateral directions due to each of gaps which are generated between upper and lower inner wall surfaces and right and left inner wall surfaces of the opening edge inner side of the adapter attaching hole, and upper and lower side wall surfaces and right and left side wall surfaces of the adapter main body, when the adapter main body for the optical connector is inserted to the adapter attaching hole of the panel.

In other words, the backlash prevention tool in the backlash prevention mechanism in the present invention comprises:

the C-shaped frame-like support portion which is installed to the engagement surface portion formed by hollowing out from the side wall surfaces to the upper and lower wall surfaces of the adapter main body;

the come-off preventing locking piece which is protruded in the diagonally outer direction from the center side edge of the C-shaped frame-like support portion so as to face to the locking protrusion formed in the center of both side surface portions of the adapter main body; and a plurality of leaf spring-like backlash preventing locking pieces which are protruded in the diagonally outer direction from both sides and upper and lower side edges of the come-off preventing locking piece at the center of the C-shaped frame-like support portion so as to come into pressure contact with the inner sides of the opening edge of the adapter attaching hole of the panel vertically and laterally, and the adapter main body is inserted to the adapter attaching hole of the panel while pressing the come-off preventing locking piece of the backlash prevention tool which is installed to the engagement surface portion, and pinches and fixes the opening edge portion of the adapter attaching hole between the locking protrusion and the come-off preventing locking piece, and each of backlash preventing locking pieces of the backlash prevention tool is formed so as to be pressure crushed and come into pressure contact with each of the inner sides of the opening edge of the adapter attaching hole vertically and laterally from the inner side to an outer side. As a result, it is possible to securely prevent generation of backlash in the vertical and lateral directions due to the gap between the opening edge inner side of the adapter attaching hole and the side surface of the adapter main body. Further, it is possible to prevent chattering sound from being generated even in the case that vibration is applied to the panel in the vertical and lateral directions. Further, it is possible to insert the optical connector plug to the adapter main body for the optical connector without trouble.

The support portion is formed into the C-shaped from by the side support surface portion at the center, and the vertical support surface portions which are extended in the perpendicular direction from both end sides of the side support surface portion, and the locking hole is formed in the center surface of the vertical support surface portion, the locking hole being engaged with the locking projection protruded from each of both upper and lower wall surfaces of the adapter main body. As a result, in the case that the C-shaped frame-like support portion is installed to the engagement surface portion which is formed by being hollowed out from the side wall surface of the adapter main body to the upper and lower wall surfaces, the locking projections respectively protruded from both the upper and lower wall surfaces of the adapter main body are engaged with the locking hole which is formed in the center surface of the vertical support surface portion. Therefore, it is possible to prevent the backlash prevention tool from coming off in the laterally outward direction from the adapter main body.

The backlash preventing locking piece is formed by a pair of lateral backlash preventing locking piece which are respectively protruded in the diagonally outer direction from both side edges of the come-off preventing locking piece at the center of the side support surface portion and are formed into the leaf spring, and a pair of vertical backwash preventing locking pieces which are protruded in the diagonally outer direction from the respective side edges of the vertical support surface portion and are formed into the leaf spring, in the support portion which is formed into the C-shaped frame by the side support surface portion at the center, and the vertical support surface portions which are extended in the perpendicular direction from both end sides of the side support surface portion. As a result, it is possible to securely prevent the chattering sound from being generated even in the case that the vibration is applied to the panel, by making the prevention of the backlash in the lateral direction of the adapter main body by the lateral backlash preventing locking piece, and the prevention of the backlash in the vertical direction of the adapter main body by the vertical backlash preventing locking piece simultaneously function. Further, it is possible to smoothly fit the adapter main body in a state in which any clearance is not generated, and a good workability can be obtained as well as the adapter main body is firmly fixed without any backlash in all the peripheral surfaces.

BRIEF EXPLANATION OF THE DRAWINGS

FIGS. 2A to 2D show the general structure of the backlash prevention tool in the same manner, in which

FIGS. 5A to 5D show a process of attaching the adapter main body to which the backlash prevention tool is attached, to an adapter attaching hole of a panel, in which

FIGS. 7A and 7B show an adapter main body to which a backlash prevention tool according to a prior art is installed, in which FIGS. 8A and 8B show an adapter main body to which a backlash prevention tool according to the other prior art is installed, in which

DETAILED DESCRIPTION OF PREFERRED EMBODIMENT

A description will be in detail given below of an embodiment of the present invention with reference to the accompanying drawings. An adapter for an optical connector according to the present invention shown by an illustrated example is constructed by an adapter main body 10 for a single fiber connector, and is structured such as to be fitted and fixed to an adapter attaching hole Q formed into a rectangular opening shape of a panel P which can be mounted in a high density manner. Here, it goes without saying that the adapter for the optical connector may be constructed by an adapter main body 10 for an optical connector having two fibers or three of more fibers.

The adapter main body 10 is formed into a rectangular tube by a molded product of a synthetic resin in such a manner as to connect two optical connector plugs R to each other, as shown in FIGS. 3, 4, 5A, 5B, 5C, 5D and 6. One plug fitting portion A and the other plug fitting portion B are provided in both ends of the adapter main body 10 so as to be communicated with each other, the one plug fitting portion A to which the optical connector plug R is inserted so that optical axes align, and the other plug fitting portion B to which the optical connector plug R or a plug of the other optical part is inserted.

Further, as shown in FIGS. 5A, 5B, 5C, 5D and 6, one cylinder 17 is provided in one of a pair of right and left joint end walls 16 and 16 which are arranged in a center portion of the adapter main body 10, so as to protrude toward a plug fitting portion A, and the other cylinder 17 is provided in the other joint wall 16 so as to protrude toward a plug fitting portion B. A sleeve holder 13 is formed by engaging and fixing the joint end walls 16 and 16 so that both the cylinders 17 and 17 are aligned their center axes on an optical axis.

Figure 1:
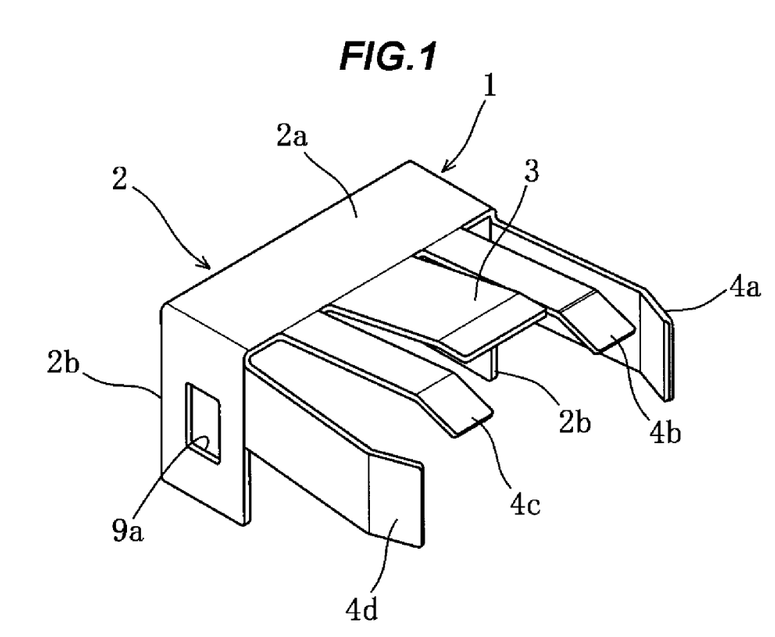
FIG. 1 is a perspective view showing an example of a general structure of a backlash prevention tool according to an embodiment of the present invention.
Figure 2A:
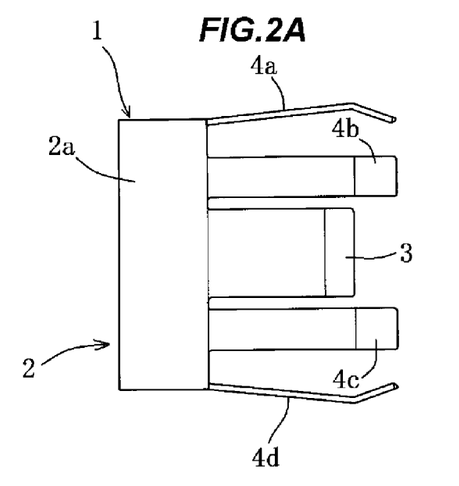
FIG. 2A is a side elevational view.
Figure 2B:
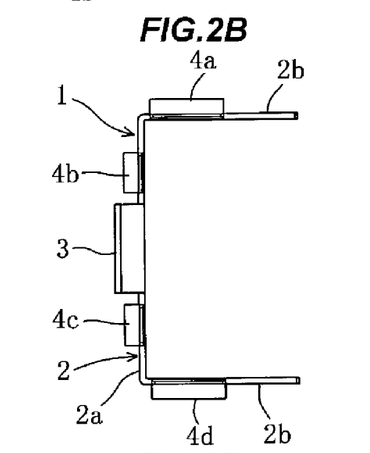
FIG. 2B is a front elevational view.
Figure 2C:
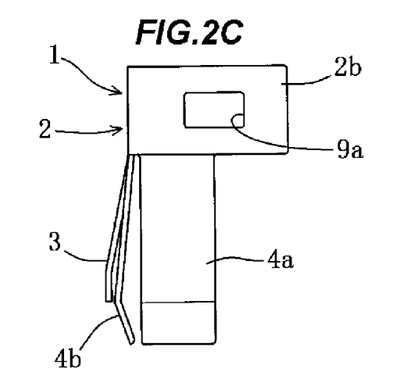
FIG. 2C is a plan view.
Figure 2D:
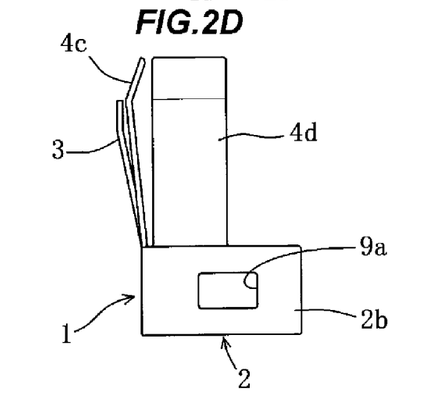
FIG. 2D is a bottom elevational view.
Figure 3:
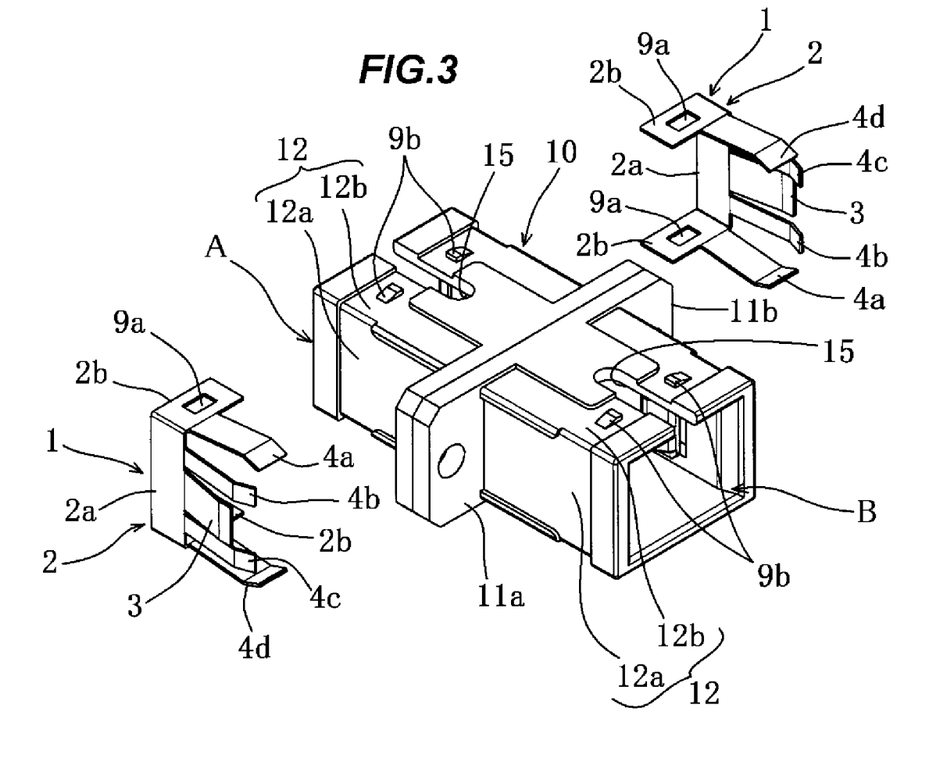
FIG. 3 is an exploded perspective view before the backlash prevention tool is installed, in an example that the backlash prevention tool is used in an adapter main body.
Figure 4:
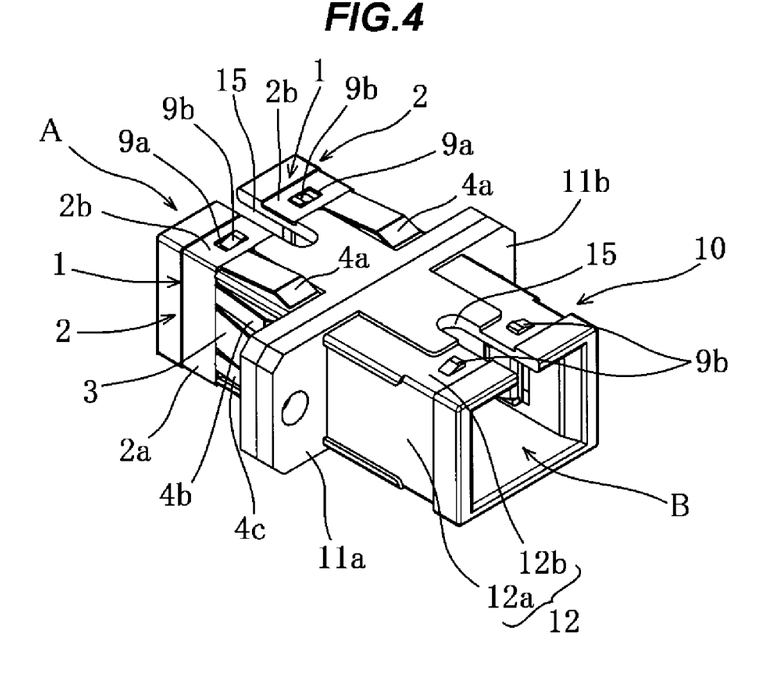
FIG. 4 is a perspective view of a state in which the backlash prevention tool is installed in the example that the backlash prevention tool is used in the adapter main body.

At this time, a cylindrical split sleeve 14 is installed and retained to an inner side of the sleeve holder 13. Further, latch pieces 7 and 8 in relation to the optical connector plug R are formed at symmetrical positions of both the joint end walls 16 and 16 so as to be along between the respective cylinders 17 and 17 and a side wall 10a of the adapter main body 10. Further, as shown in FIGS. 3, 4 and 6, a key groove 15 forming a linear groove streak along a direction of an optical axis is formed at the center of an upper side wall in each of the plug fitting portions A and B, for guiding and keeping safety at the optical connector plug R inserting time.

Figure 6:
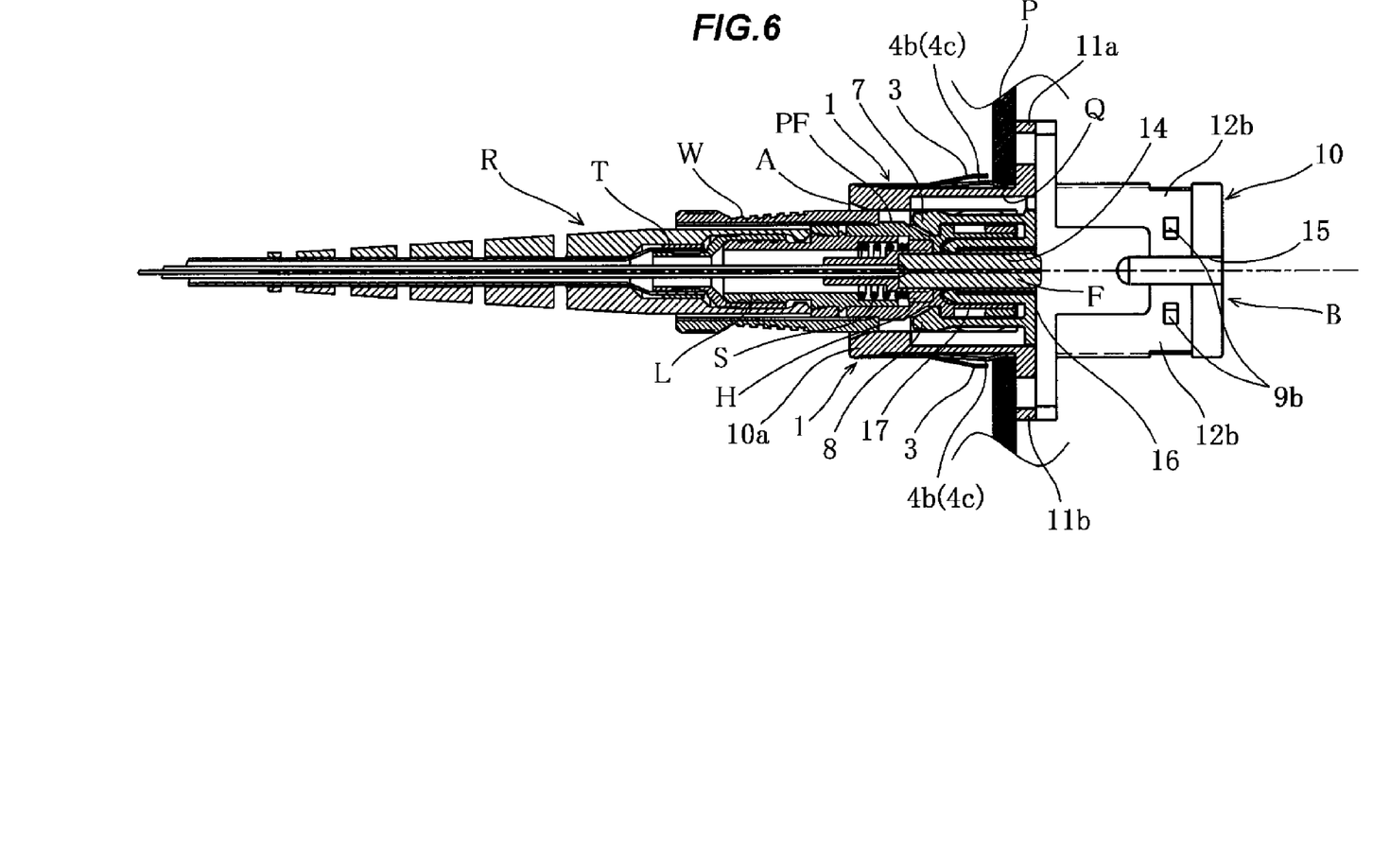
FIG. 6 is a partly cut plan view of a state in which a plug is inserted to the adapter main body which is attached to the adapter attaching hole of the panel via the backlash prevention tool.

A specific structure of the optical connector plug R is constructed by a ferrule F to which an optical fiber core wire is inserted and fixed, and a flange H is pressure inserted and retained at its rear end, a stop ring L which supports a rear end of a spring S coming into contact with a rear end of the flange H and energizing the ferrule F forward, a plug frame PF which covers each of the members, a caulking seat which fixes a Kevlar corresponding to a tensile strength wire of the optical cable to the stop ring L, a caulking tool T which is constructed by a caulking ring fixing a sheath to the caulking seat, the sheath corresponding to a synthetic resin outer skin which covers an outer side of the Kevlar of the optical cable, a boot V which is installed to the stop ring L, and a grip W which is put on an outer side of the plug frame PF and the stop ring L, as shown in FIG. 6. Further, a key projection (not shown) is protruded in the grip W, for example, at the center of an upper surface of an upper side wall, the key projection being formed approximately into an oval shape in a plane for fitting to the key groove 15 in each of the plug fitting portions A and B.

Locking portions 11a and 11b and engagement surface portions 12 for a backlash prevention tool 1 mentioned later are formed in the adapter main body 10, as shown in FIGS. 3, 4, 5A, 5B, 5C, 5D and 6. The locking protrusions 11a and 11b are integrally formed at the center of both left and right side surfaces of the adapter main body 10 and are formed into a vertically long flange, and the engagement surface portions 12 for the backlash prevention tool 1 are formed from positions of the locking protrusions 11a and 11b, for example, toward one plug fitting portion A by being hollowed out from both side surfaces of the adapter main body 10 toward a part of both upper and lower surfaces so as to be thinned. The engagement surface portions 12 are provided at symmetrical positions in front of and at the back of the adapter main body 10 via the locking protrusions 11a and 11b, and are structured such that the backlash prevention tool 1 can be attached to the other plug fitting portion B side.

In other words, the engagement surface portion 12 is formed by an engagement side surface portion 12a which has the same shape and the same size as those of a support portion 2, a come-off preventing locking piece 3 and backlash preventing locking pieces 4a, 4b, 4c and 4d which construct the backlash prevention tool 1, and is hollowed out and formed in each of right and left side wall surfaces of the adapter main body 10 like an approximately rectangular shape, and an engagement plane surface portion 12b which is hollowed out and formed in each of upper and lower side wall surfaces of the adapter main body 10 like an approximately L-shaped form. Two backlash prevention tools 1 having the same structure are detachably mounted and used so as to pinch the engagement surface portion 12 of the adapter main body 10 from both right and left sides.

Accordingly, as shown in FIGS. 1, 2A, 2B, 2C and 2D, the backlash prevention tool 1 is provided with the support portion 2 which is formed into a C-shaped frame by a center lateral support surface portion 2a, and vertical support surface portions 2b extended in a perpendicular direction from both end sides of the lateral support surface portion 2a, the come-off preventing locking piece 3 which is protruded in a diagonally outer direction from the lateral support surface portion 2a of the support portion 2, and a plurality of, that is, totally four leaf spring-like backlash preventing locking pieces 4a, 4b, 4c and 4d which are protruded in diagonally outer directions respectively from vertical symmetrical positions of a side edge of the lateral support surface portion 2a via the come-off preventing locking piece 3 and respective side edges of the vertical support surface portions 2b.

At this time, the come-off preventing locking piece 3 and the backlash preventing locking pieces 4a, 4b, 4c and 4d are formed by being folded like an approximately obtuse-angled shape from a root position of the support portion 2 side toward sides where the locking protrusions 11a and 11b are positioned in a state in which an elasticity is applied, and respective leading ends of the backlash preventing locking pieces 4a, 4b, 4c and 4d are formed so as to face to the vertically long flange-like locking protrusions 11a and 11b which are formed at the center of both the side surface portions of the adapter main body 10, when the support portion 2 is installed to the engagement surface portion 12 of the adapter main body 10.

Further, the backlash preventing locking pieces 4a, 4b, 4c and 4d of the backlash prevention tool 1 are arranged in a state in which the backlash preventing locking pieces 4a, 4b, 4c and 4d are locked short of the locking protrusions 11a and 11b of the adapter main body 10, and the come-off preventing locking piece 3 is formed shorter at a width of the panel P than lengths of the backlash preventing locking pieces 4a, 4b, 4c and 4d. In other words, a distance from the locking protrusions 11a and 11b to the leading end of the come-off preventing locking piece 3 is set to be approximately the same size as a thickness of an adapter attaching hole Q portion of the panel P.

Therefore, when the adapter main body 10 is inserted to the adapter attaching hole Q of the panel P, the adapter main body 10 is inserted to the adapter attaching hole Q of the panel P while pressing the come-off preventing locking piece 3 of the backlash prevention tool 1, and pinches and fixes an opening edge portion of the adapter attaching hole Q between the locking protrusions 11a and 11b and the come-off preventing locking piece 3, as shown in FIG. 5. Further, the backlash preventing locking pieces 4a, 4b, 4c and 4d of the backlash prevention tool 1 respectively come into pressure contact with upper, lower, left and right sides of an inner side of the opening edge of the adapter attaching hole Q from an inner side to an outer side while being pressure crushed, and the adapter main body 10 itself is retained to the panel P without any backlash. As a result, it is possible to avoid all the backlash in the vertical and lateral directions of the adapter main body 10.

Further, a locking hole 9a formed into a rectangular opening is formed in a center surface of the vertical support surface portion 2b of the backlash prevention tool 1, and a locking projection 9b is formed in the plug fitting portions A and B of the engagement plane surface portion 12b of the adapter main body 10 in correspondence to the locking hole 9a, the locking projection 9b being provided with an inclined surface toward an outer side and being formed into an approximately trapezoidal shape or a right angled triangle.

As a result, when the C-shaped frame-like support portion 2 is installed to the engagement surface portion 12 which is hollowed out and formed from the side wall surface of the adapter main body 10 toward the upper and lower wall surfaces, the locking projections 9b of the adapter main body 10 are respectively engaged with engaged with the locking holes 9a of the vertical support surface portion 2b. The locking projections 9b are provided at the front and back symmetrical positions of the adapter main body 10 via the locking protrusions 11a and 11b, and are structured such that the backlash prevention tool 1 itself can be engaged even in the case that the backlash prevention tool 1 is attached to the other plug fitting portion B side.

Next, a description will be given of an example of use of the embodiment which is structured as mentioned above.

First of all, it is possible to achieve a state in which attachment and detachment of the backlash prevention tool 1 in the outer direction from the adapter main body 10 is blocked, by pressing the support portion 2 side of the backlash prevention tool 1 to the engagement surface portions 12 provided in the right and left side surfaces of the adapter main body 10 from the lateral direction, and respectively engaging the locking projections 9b provided in the engagement plane surface portions 12b of the adapter main body 10 with the locking holes 9a provided in the vertical support surface portions 2b of the backlash prevention tool 1, as shown in FIG. 3.

As a result, as shown in FIG. 4, as well as the lateral support surface portion 2a of the backlash prevention tool 1 is fitted and retained to the engagement side surface portion 12a, the respective backlash preventing locking pieces 4a, 4b, 4c and 4d are arranged in a state in which the backlash preventing locking pieces are locked short of the locking protrusions 11a and 11b of the adapter main body 10.

Figure 5A:
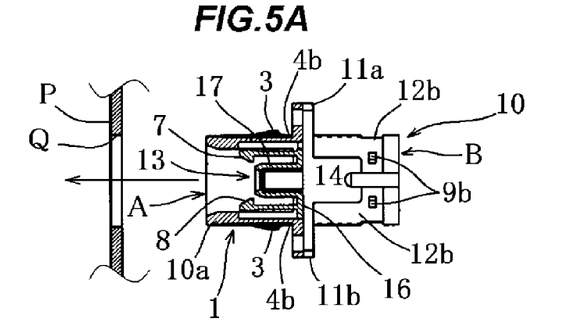
FIG. 5A is a partly cut plan view showing a state before being attached to the adapter attaching hole.
Figure 5B:
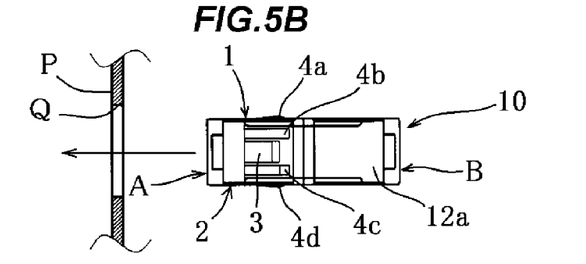
FIG. 5B is a side elevational view.

Next, the plug fitting portion A side of the adapter main body 10 is inserted to the adapter attaching hole Q of the panel P, as shown in FIGS. 5A and 5B.

Figure 5C:
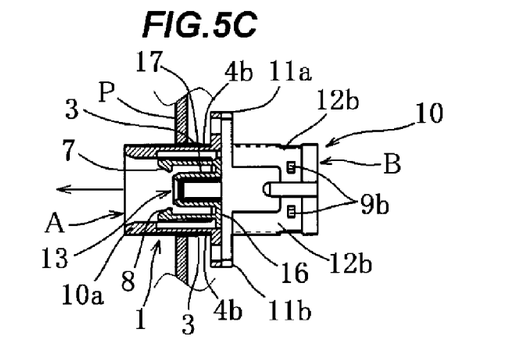
FIG. 5C is a partly cut plan view showing a state in the process of being attached to the adapter attaching hole.

Further, the come-off preventing locking piece 3 of the backlash prevention tool 1 is first of all going to be inserted to the adapter attaching hole Q while being pressed, in the process of insertion, as shown in FIG. 5C.

Figure 5D:
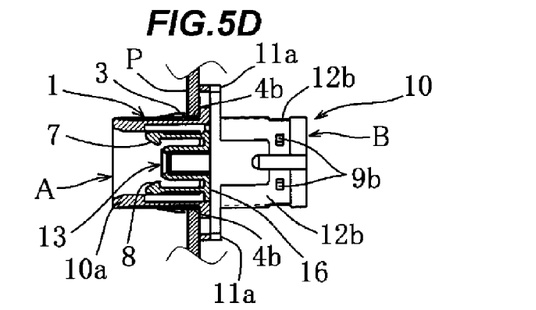
FIG. 5D is a partly cut plan view showing a state after being attached to the adapter attaching hole.

Further, as shown in FIG. 5D, when the locking protrusions 11a and 11b of the adapter main body 10 come into contact with the adapter attaching hole Q, the come-off preventing locking piece 3 elastically returns and expands outward, and is fixed while pinching the opening edge portion of the adapter attaching hole Q between the locking protrusions 11a and 11b and the come-off preventing locking piece 3.

At the same time, the backlash preventing locking pieces 4a, 4b, 4c and 4d come into pressure contact with the inner side of the opening edge of the adapter attaching hole Q from the inner side to the outer side while being pressure crushed, and the adapter main body 10 itself is retained.

As a result, it is possible to securely prevent generation of the backlash in the vertical and lateral directions of the adapter main body 10 due to each of the gaps which are generated between the upper and lower inner wall surfaces and the right and left inner wall surfaces of the inner side of the opening edge of the adapter attaching hole Q, and the upper and lower side wall surface and the right and left side wall surfaces of the adapter main body 10.

What is claimed is:

1. A backlash prevention mechanism of an adapter for an optical connector comprising:
   a pair of right and left backlash prevention tools which are detachably mounted to an adapter main body for an optical connector,
   wherein each of said backlash prevention tools comprises:
   a C-shaped frame-like support portion which is installed to an engagement surface portion formed by hollowing out from side wall surfaces to upper and lower wall surfaces of said adapter main body;

a come-off preventing locking piece which is protruded in a diagonally outer direction from a center side edge of said C-shaped frame-like support portion so as to face to a locking protrusion formed in the center of both side surface portions of said adapter main body; and a plurality of leaf spring-like backlash preventing locking pieces which are protruded in a diagonally outer direction from both sides and upper and lower side edges of said come-off preventing locking piece at the center of said C-shaped frame-like support portion so as to come into pressure contact with inner sides of an opening edge of an adapter attaching hole of a panel vertically and laterally, and wherein said adapter main body is inserted to the adapter attaching hole of said panel while pressing the come-off preventing locking piece of said backlash prevention tool which is installed to said engagement surface portion, and pinches and fixes the opening edge portion of the adapter attaching hole between said locking protrusion and said come-off preventing locking piece, and each of backlash preventing locking pieces of said backlash prevention tool is formed so as to be pressure crushed and come into pressure contact with each of the inner sides of the opening edge of the adapter attaching hole vertically and laterally from an inner side to an outer side.

2. The backlash prevention mechanism of the adapter for the optical connector according to claim 1, wherein said support portion is formed into a C-shaped from by a side support surface portion at the center, and vertical support surface portions which are extended in a perpendicular direction from both end sides of said side support surface portion, and a locking hole is formed in a center surface of the vertical support surface portion, the locking hole being engaged with a locking projection protruded from each of both upper and lower wall surfaces of said adapter main body.

3. The backlash prevention mechanism of the adapter for the optical connector according to claim 1, wherein said backlash preventing locking piece is formed by a pair of lateral backlash preventing locking piece which are respectively protruded in a diagonally outer direction from both side edges of said come-off preventing locking piece at the center of said side support surface portion and are formed into a leaf spring, and a pair of vertical backwash preventing locking pieces which are protruded in a diagonally outer direction from the respective side edges of said vertical support surface portion and are formed into a leaf spring, in the support portion which is formed into the C-shaped frame by the side support surface portion at the center, and the vertical support surface portions which are extended in the perpendicular direction from both end sides of said side support surface portion.

* * * * *